Nov. 7, 1961     M. H. WOLFBAUER, JR     3,008,034
FLUID-OPERATED PRESSURE-APPLYING DEVICES
Filed March 31, 1960     3 Sheets-Sheet 2
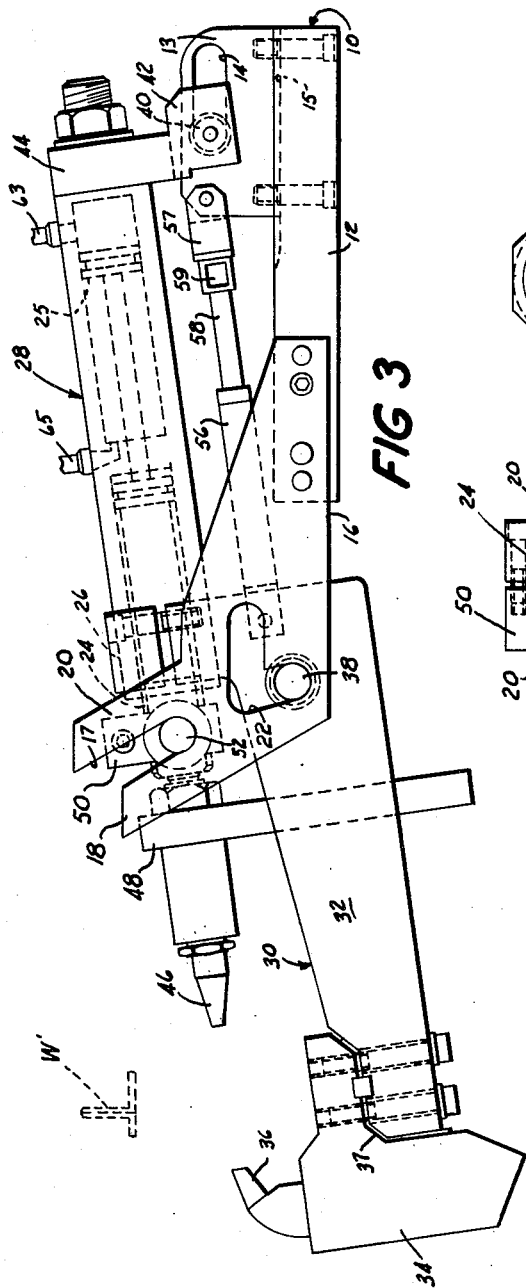
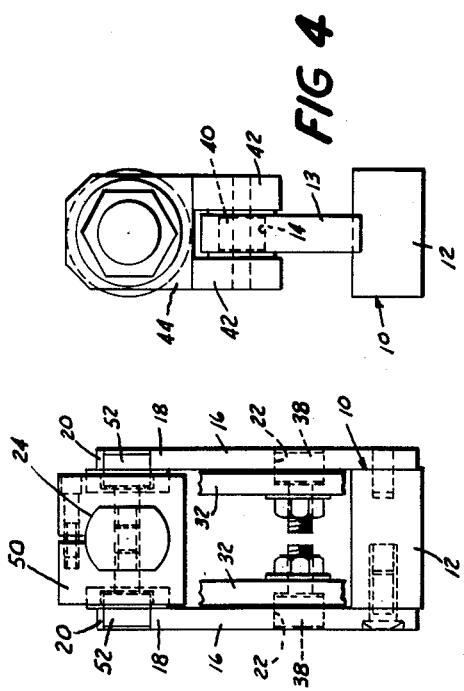
MICHAEL H. WOLFBAUER JR. INVENTOR.
BY William L. Fisher
ATTORNEY Nov. 7, 1961 M. H. WOLFBAUER, JR 3,008,034
FLUID-OPERATED PRESSURE-APPLYING DEVICES
Filed March 31, 1960 3 Sheets-Sheet 3

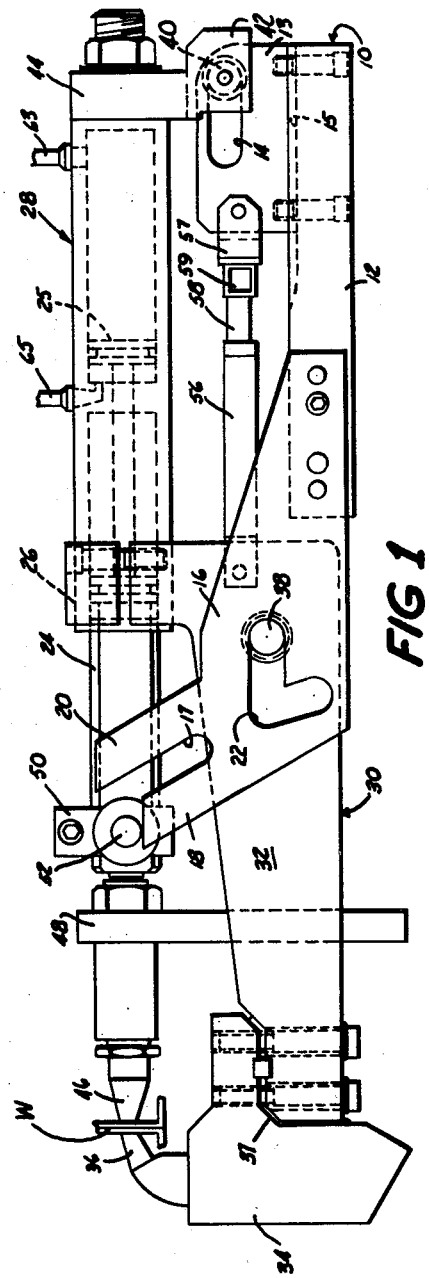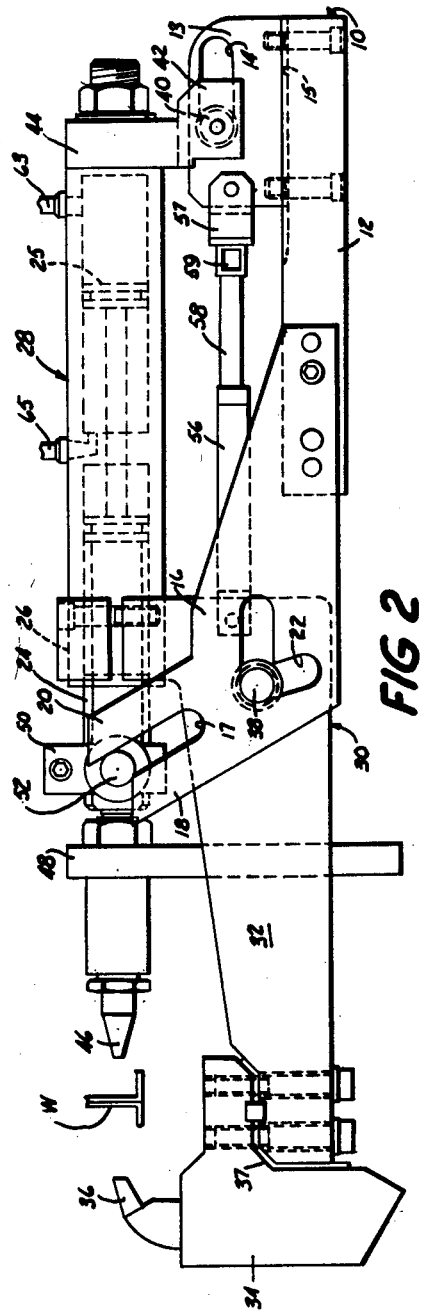

MICHAEL H. WOLFBAUER JR. INVENTOR.
BY William L. Fisher
ATTORNEY

United States Patent Office 3,008,034
Patented Nov. 7, 1961

3,008,034
FLUID-OPERATED PRESSURE-APPLYING
DEVICES
Michael H. Wolfbauer, Jr., 20444 Woodland, Harper
Woods, Wayne County, Mich.
Filed Mar. 31, 1960, Ser. No. 19,084
41 Claims. (Cl. 219—89)

This invention relates to improvements in fluid-operated pressure-applying devices and more particularly to an improved fluid-operated pressure-equalizing resistance welding device.

In my prior co-pending United States application, S.N. 769,168, filed October 23, 1958, there is shown and described a fluid-operated pressure-equalizing resistance welding device which embodies certain basically novel structural concepts and in relation thereto the present invention has for its principal objects the provision of an improved device of the same general character embodying still further novel combination of structure heretofore unknown in this art and effecting simplification of manufacture and operation as will be apparent from the following description taken in conjunction with the accompanying drawings.

In the drawings:

FIG. 1 is a side elevational view of a pressure-equalizing resistance welding device embodying the present invention with the moveable parts thereof shown in weld position;

FIGS. 2 and 3 are views similar to FIG. 1 of the same device with the moveable parts shown, respectively, in intermediate and fully open position;

FIGS. 4 and 5 are opposite end elevational views of the structure of FIG. 1 with parts removed for the view shown in FIG. 5;

Figure 6:
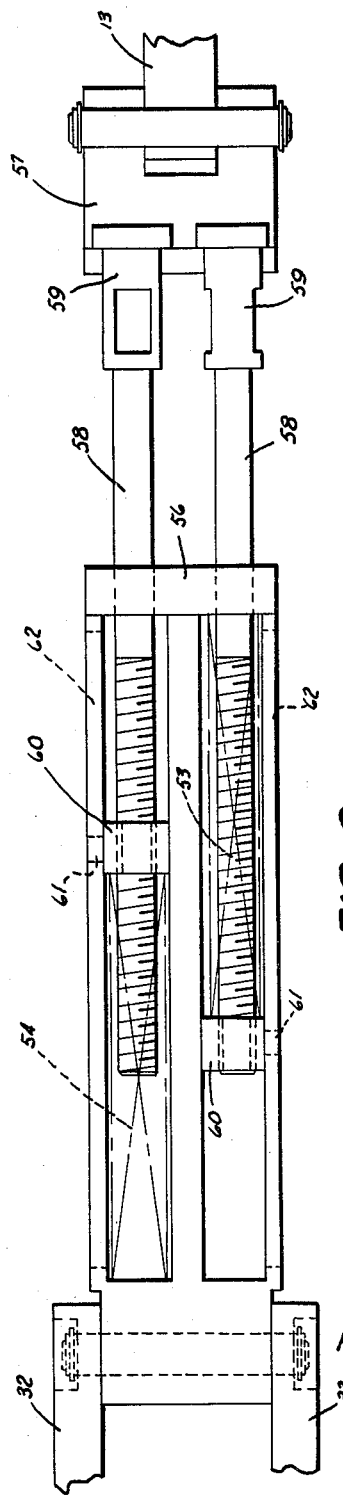
FIG. 6 is a fragmentary plan view of certain parts of the structure of FIG. 1.

Referring to the drawings in greater detail, the base of the device which may be mounted in a slideway (not shown) or on suitable stationary structure is indicated generally at 10 and comprises a horizontal bar 12 at the rear end of which is secured an upright member 13 fitted in a keyway 15 formed in the bar inwardly from its top face at this rear end. A blind-end horizontal track 14 is formed in the member 13 for purposes which will appear. Joined to the front of the bar 12 on opposite sides thereof is a pair of spaced plates 16 which extend forwardly of this end as shown. Each plate 16 has an upstanding end which extends forwardly and upwardly from the end thereof which is secured to the bar 12 and in such upstanding end an open-ended track 17 is formed between two arms 18 and 20. Intermediate the ends of each plate a blind-ended track 22 (FIG. 5) is formed therein which has a horizontal leg and an approximately vertical leg, the two legs being disposed at slightly less than a right angle for reasons which will later appear.

Free-wheeling cam rollers ride in each of the tracks mentioned and the welding gun, which comprises a cylinder and piston and the electrodes they separately carry as will be further described, is reciprocatably supported on the base 10 and guided in its movements by the coaction of these cams and their respective tracks. As mentioned, the welding gun comprises a fluid-powered cylinder and piston unit of the type described in the aforementioned prior application which is so constructed that on the power stroke of the unit the piston rod indicated at 24 for the double piston shown in dotted outline and indicated generally at 25 travels outwardly of the front end 26 of the cylinder which is generally designated 28. As in said prior application, a yoke member indicated at 30 having spaced sides 32 joined at two of its ends is secured by way of one of said ends to the front end 26 of the cylinder and at the other of said ends to a bus-bar structure 34 to which electrical cables (not shown) are attached for conducting current to electrode 36 which the cylinder carries, there being suitable insulation 37 between the bus-bar structure 34 and said other or front end of the yoke member 30 as shown. The yoke member 30 operates between the spaced plates 16 and intermediate the mentioned ends of the yoke member 30 is a pair of the free-wheeling cam rollers already mentioned. The pair of cam rollers indicated at 38 project laterally from the spaced sides 32 of the yoke member to which they are secured as shown and each operates in the blind-ended track of its adjacent corresponding plate 16.

The movement of the electrode 36 is determined by the movement of the yoke member 30 to which it is attached and the yoke member is guided and rollably supported in its movement by the cams 38 and the track 22 in each plate 16. The rear end of the cylinder 28 is supported and guided by another free-wheeling cam roller 40 which is rotatably supported as shown between bifurcations 42 at the lower end of a connecting member 44, the upper end of which is secured to the rear end of the cylinder 28 as shown. The cam roller 40 rides in the track 14 in the upright member 13 and carries thereover the bifurcated lower end of the member 44.

The free end of the piston rod 24 carries an electrode 46 similar to the electrode 36 which it opposes and is joined to said piston rod through an electrode holder as shown and a bus-bar structure 48 which may extend through the space between the sides of the yoke member 30, as shown, for effecting electrical connection to each electrode from a common side of the cylinder and piston. Joined to the piston rod 24 behind the bus-bar structure 48 is a block 50 which interfits between the upstanding ends of the plate 16 and carries another pair of free-wheeling cam rollers 52 which project laterally from its opposite sides. The cam rollers 52 operate in the open-ended tracks 17 previously mentioned and ride over the upper surface of the arms 18 during movement of the piston into and out of its extreme open position as will be described.

Figure 7:
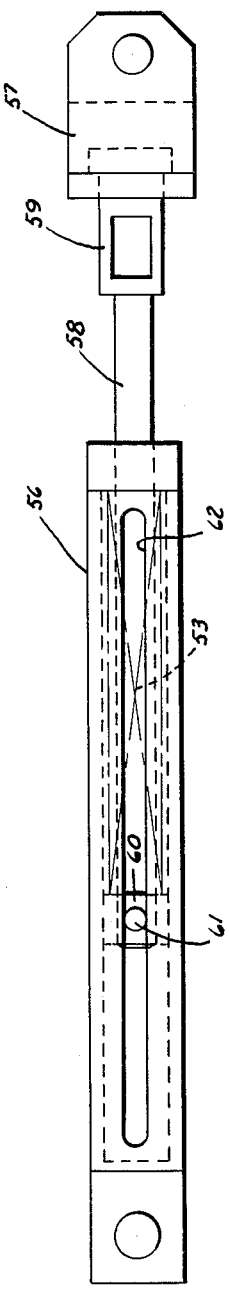
FIG. 7 is a side elevational view of part of the structure of FIG. 6.

Control of the position of the center of contact between the electrodes 26 and 46 over the length of the gap by a pair of compression springs which operate oppositely of each other and both coordinately in each direction of the piston stroke as in said prior application is accomplished in the present invention through side by side disposition of such springs which are designated by reference numerals 53 and 54. The springs 53 and 54 operate between the stationary upright member 13 of the base 10 and the yoke member 30 and each is carried in a common casing 56, one end of which is joined between the sides 32 of the yoke member at its lower rear end as shown. The other end of the casing 56 is separately apertured to receive the threaded ends of a pair of rods 58 which extend into the casing to be each encircled by one of the springs 53 and 54 as best shown in FIG. 6. The unthreaded ends of the rods 58 are pivotally connected to the front end of the upright member 13 by a clevis 57 to which each is joined through an integral turnbuckle structure 59 formed on these ends as shown in FIGS. 6 and 7. The turnbuckle structure 59 on each rod is cylindrically enlarged as shown and has flats formed on opposite sides for wrench engagement by which the rods 58 are turned. A further enlargement or flange on this end of each rod is retained within a correspondingly shaped recess in the clevis 57 by a cover plate for the clevis as shown which allows the rods to rotate. Threadably carried separately on the threaded ends of the rods 58 within the casing 56 are a pair of sleeves 60 which traverse the casing each in accordance with and upon rotation of its respective rod through turning of the corresponding turnbuckle structure. Each sleeve 60 is restrained against rotation on its respective rod by a laterally projecting ear 61 fixed thereon which moves in a horizontal slot 62 formed in each of the opposite sides of the casing 56 as shown. The stationary ends of the springs 53 and 54 operate against opposite ends of the casing 56 as shown and their moveable ends oppositely each against one of the sleeves 60. As the sleeves traverse the casing 56, oppositely of the other, they compress their corresponding springs and, conversely, as they traverse the casing in the same direction one compresses and the other relaxes its corresponding spring. The spring 53 controls the movement of the piston 25 while the spring 54 controls the movement of the cylinder 28 so that by coordinate adjustment of the spring tensions the relative movement of the cylinder and piston and hence the position of the center of contact of the electrodes across the gap with reference to the base 10 and to the work can be predeterminedly selected and the movement of the two oppositely of each other is maintained in near perfect dynamic equilibrium.

In operation of the device, a source of fluid such as air under pressure through suitable valving and timing mechanism (not shown) is alternately admitted and exhausted through one and the other of fittings 63 and 65 into the chambers of the cylinder 28 to actuate the piston 25. Assuming that the moveable parts are as shown in FIG. 1 and that the weld has been made on the workpart indicated at W therein, and that the flow of welding current to the electrodes 36 and 46 through their respective bus-bar structure has terminated, pressure air is admitted to the cylinder chambers on the rod side of the double piston 25 through the fitting 65 whereupon the piston 25 moves toward the rear end of the cylinder carrying with it by means of its piston rod 24 the electrode 46 to the right toward its extreme open position. The exhaust air in the cylinder chambers on the opposite side of the double piston is conducted out of the cylinder through the fitting 63.

Simultaneously with the actuation of the piston 25 to the right, the cylinder 28 moves to the left carrying with it by means of the yoke member 30 the electrode 36 towards its extreme open position. The cylinder 28 moves freely in each of its opposite directions of movement and in this opening movement its rear end rolls to the left over the upright member 13 by virtue of the cam roller 40 riding in the track 14. The front end 26 of the cylinder similarly rolls between the pair of plates 16 being supported by the pair of cam rollers 38 carried by the yoke member 30 as they ride in the horizontal legs of the tracks 22. The piston rod 24 likewise rolls over the top surface of the arms 18 as it moves to the right being supported by the pair of cam rollers 52. The engagement of the cam rollers 52 with the arms 20 at the trailing edges of the slots 17 stops the movement to the right of the piston rod 24 and at the same time the movement of the cylinder 28 to the left is stopped by engagement of the cam rollers 38 with the leading edges of the vertical legs of the tracks 22. Such edges act as positive stops in opening for the cylinder and piston. This intermediate open position for these parts is shown in FIG. 2.

The cylinder 28 and the piston 25 in thus being stopped short in their movement in opening are prevented from bottoming with each other, thus creating unbalanced forces which pivot the cylinder and piston about the axis of the cam roller 40 at the rear end of the cylinder tipping its front end 26 and the piston rod 24 with it downwardly. The cam rollers 52 ride down the arms 20 at the trailing edges of the tracks 17 carrying the piston rod 24 and the electrode 46 it carries into the extreme open position shown for these parts in FIG. 3 and at the same time the yoke member 30 is carried downwardly bringing the front end 26 and the electrode 36 with it while the cam rollers 38 ride down the leading edges of the vertical legs of the tracks 22 into the position shown for them in this same figure. It should be here noted that the device can operate in a vertical as well as horizontal position and any position intermediate thereto. The amount of tipping can be made adjustable by the provision of a member that operates in the vertical leg of the slot 22 as for example by a set screw (not shown) threadably carried in one of the plates 16 centrally of the vertical leg of the track 22 so that the free end of the screw projects upwardly into this leg and is moveable along its length. When the free end of the screw is retracted out of the vertical leg of the track 22, full tipping action takes place which tipping action decreases as the free end moves upwardly into the leg until no tipping can take place when it is substantially even with the bottom surface of the horizontal leg of the track.

In the tilted extreme open position shown for the moveable parts in FIG. 3 advantageously the work can move straight horizontally or head-on into position for weld as in said prior application wherein a new workpart W prime is shown in FIG. 3 thus moved into ready for weld position. The moveable parts will remain in this tipped position until the direction of air flow from the source of air under pressure is reversed whereby pressure air is admitted to cylinder chambers on the side of the double piston 25 opposite its rod side through the fitting 63 and exhaust air is conducted out of the cylinder chambers from the rod side of the piston through the fitting 65. Immediately upon reversal of the air pressure, the piston rod 24 and the front end 26 of the cylinder climb into the horizontal intermediate position shown in FIG. 2, there being no tendency for the electrodes to close during this action (except for the minute amount of closing that takes place as the cam rollers ride up their respective track surfaces as will be described) nor any tendency for the cylinder and piston to revert to its tipped position. In other words, the movement thus mentioned into a horizontal position of the welding gun during the first phase of the power stroke of the piston for welding is positive and fully controlled as respects the electrodes. The cam rollers 52 ride up the arms 18 at the leading edges of the tracks 17 upon such reversal of air pressure thus pivoting the welding gun about the axis of the cam roller 40 in the opposite rotational direction as before which accounts for the climbing action mentioned, and simultaneously the cam rollers 38 ride up the trailing edges of the vertical legs of the tracks 22.

It will be noted that the backup electrode 36 has substantially no movement in closing, i.e. no longitudinal movement relative to the base, during this period because of the nearly vertical disposition of the vertical track legs while there is a minute amount of movement in closing of the electrode 46 equal to the horizontal component of the incline of the leading edges of the tracks 17, such incline being as steep as it can be without expending too much of the power stroke in effecting the climbing action and without tendency for the gun to lock in open position. For all practical purposes the electrodes are maintained in their fully open positions during this first phase of the welding stroke until the welding gun assumes the horizontal position shown in FIG. 2 and at this point the piston rod 24 moves to the left bringing the electrode 46 it carries with it into weld position shown in FIG. 1 rolling over the top surface of the arm 18 by the action of the cam rollers 52 and at the same time the cylinder 28 moves to the right rolling in the tracks 14 and 22 in the base. By the means shown of three cam rollers operating in respective tracks and interconnected, two to one element and the third to the other element, of the fluid-powered drive, the swing paths of the electrode pairs are thereby determined. The two cam rollers 38 and 40 as shown are in fixed relationship to each other and are connected, in this case individually, to the cylinder side of the drive 25, 28 while the cam roller 52 is connected to the piston side. By choice of the contour of the tracks 22, 14 and 17 the electrode pairs 36, 46 can be made to follow any desired swing paths, e.g., in straight lines, in circular or non-circular arcs or any combination of these. The electrodes 36 and 46 in spite of the differential masses which carry them may be balanced substantially perfectly in their movements across the gap by adjustment of the particular compression spring structure provided and already described so that the electrodes gently without slamming but firmly engage the work for welding in the position shown in FIG. 1. The moveable parts of the device remain in this position during the time that welding current is conducted to the electrode pairs through their respective bus-bar structures and for any preselected time interval thereafter depending upon the particular application which dictates the cyclefor the timing mechanism and after elapse of the proper time interval the direction of air flow from the source of air under pressure is reversed whereupon the above described cycles of operation are automatically repeated.

It will thus be seen that there has been provided by the present invention a fluid-operated pressure-equalizing resistance welding device in which the object hereinabove set forth together with many thoroughly practical advantages are successfully achieved. While the preferred embodiment of the instant invention has been disclosed it is to be understood that modifications, variations and changes may be resorted to without departing from the spirit of the invention or the scope of the appended claims.

What is claimed is:

1. In a fluid-operated pressure-equalizing resistance welding device having a base, the combination comprising a fluid powered cylinder and piston unit so constructed that on the power stroke of the unit the piston rod for the piston travels outwardly of one end of the cylinder, a yoke member secured to said one end of the cylinder and having an end for carrying one of the opposing electrodes of the device, cam and track means joining the base and each of said yoke member and said cylinder for rollably mounting the cylinder on said base.

2. In a fluid-operated pressure-equalizing resistance welding device having a base, the combination comprising a fluid powered cylinder and piston unit so constructed that on the power stroke of the unit the piston rod for the piston travels outwardly of one end of the cylinder, a yoke member secured to said one end of the cylinder and having an end for carrying one of the opposing electrodes of the device, a cam roller carried on the yoke member, a cam roller carried on the cylinder, a cam roller carried on the free end of the piston rod, and respective tracks on the base in which said cam rollers operate.

3. For use in a fluid-operated pressure-equalizing resistance welding device having a mounting base with separate tracks in it, the combination comprising a fluid powered cylinder and piston unit so constructed that on the power stroke of the unit the piston rod for the piston travels outwardly of one end of the cylinder, a cam roller carried by the cylinder and a cam roller carried by the free end of the piston rod for operation in respective tracks on the base of the device.

4. For use in a fluid-operated pressure-equalizing resistance welding device having a base with separate tracks in it, the combination comprising a fluid powered cylinder and piston unit so constructed that on the power stroke of the unit the piston rod for the piston travels outwardly of one end of the cylinder, a yoke member secured to said one end of the cylinder and having an end for carrying one of the opposing electrodes of the device, a cam roller carried on the yoke member and a cam roller carried on the cylinder, and a cam roller carried on the free end of the piston rod for operation in respective tracks on the base of the device.

5. In a fluid-operated pressure-applying device having a base means including chamber walls providing a piston chamber, a fluid powered piston slidably carried in said piston chamber, the piston rod for the piston operating out of one end of the piston chamber, a pressure-applying tip carried by one of said chamber walls and said piston rod, means movably mounting said chamber walls on the base of the device and providing for movement of said chamber walls and the piston oppositely of each other under force of fluid pressure, said last-mentioned means comprising cam and track means joining the base and said chamber walls for reciprocating said chamber walls on said base, said cam and track means including a pivot connection for said chamber walls which is movable therewith relative to the base, the chamber walls pivoting about said pivot connection between two angularly different positions relative to the base at a predetermined point in the piston stroke.

6. In a fluid-operated pressure applying device having a base, a fluid powered cylinder and piston separately carrying opposed pressure-applying tips and constructed so that on the power stroke of the piston its piston rod travels outwardly of one end of the cylinder, the free end of the piston rod joined to the tip nearest said one end of the cylinder, a yoke member joining said one end of the cylinder and the other of said tips, the tips closing in one plane on the power stroke of the piston, a first track means on the base, a pivot connection for the cylinder at its end opposite said one end, said pivot connection moveable with the cylinder relative to the base and rollably carried in said first track means, the cylinder and piston tipping about said pivot connection during the return stroke of the piston, the final opening of the tips on the return stroke of the piston being in another plane angularly disposed with respect to said one plane, a second track means on the base, means joined to the yoke member rollably carried in said second track means for controlling the movement of said one cylinder end during the tipping of the cylinder and piston.

7. In a fluid-operated pressure-equalizing resistance welding device having a base, the combination comprising a fluid powered cylinder and piston unit separately carrying opposed pressure-applying current-carrying electrodes and so constructed that on the power stroke of the unit the piston rod for the piston travels outwardly of one end of the cylinder, said piston rod carrying the electrode of the device nearest said one end, a yoke member joined at one of its ends to said one end of the cylinder and carrying the other of said electrodes at another of its ends, track means on the base for reciprocating the cylinder thereon, the cylinder and said yoke member joined to means rollably carried in said track means.

8. In a fluid-operated pressure-equalizing resistance welding device having a base, the combination comprising a fluid powered cylinder and piston unit separately carrying opposed pressure-applying current-carrying electrodes and so constructed that on the power stroke of the unit the piston rod for the piston travels outwardly of one end of the cylinder, said piston rod carrying the electrode of the device nearest said one end, a yoke member joined at one of its ends to said one end of the cylinder and carrying the other of said electrodes at another of its ends, track means on the base for reciprocating the cylinder thereon, the free end of the piston rod, the cylinder and said yoke member joined to means rollably carried in said track means, a pivot connection for the cylinder which is moveable therewith relative to the base in said track means, and means for pivoting the cylinder about said pivot connection during the stroke of the piston.

9. In a fluid operated pressure-equalizing resistance welding device having a base, the combination comprising a fluid powered cylinder and piston unit separately carrying opposed pressure-applying current-carrying electrodes and so constructed that on the power stroke of the unit the piston rod for the piston travels outwardly of one end of the cylinder, said piston rod carrying the electrode of the device nearest said one end, a yoke member joined at one of its ends to said one end of the cylinder and carrying the other of said electrodes at another of its ends, track means on the base for reciprocating the cylinder thereon, the end of the cylinder opposite said one end joined to means rollably carried in said track means, the yoke member also joined to means rollably carried in said track means, a compression spring operating on the cylinder through the yoke member and against the base, one end of said spring carried on said yoke member and moveable therewith.

10. In a fluid operated pressure-equalizing resistance welding device having a base, the combination comprising a fluid powered cylinder and piston unit separately carrying opposed pressure-applying current-carrying electrodes and so constructed that on the power stroke of the unit the piston rod for the piston travels outwardly of one end of the cylinder, said piston rod carrying the electrode of the device nearest said one end, a yoke member joined at one of its ends to said one end of the cylinder and carrying the other of said electrodes at another of its ends, track means on the base of the device for reciprocating the cylinder thereon, the end of the cylinder opposite said one end joined to means rollably carried in said track means, the yoke member also joined to means rollably carried in said track means, a compression spring operating on the cylinder through the yoke member and against the base, one end of said spring carried on said yoke member and moveable therewith, another compression spring operating on the cylinder oppositely of the first spring and against the base, one end of said other spring carried on said yoke member and moveable therewith.

11. For use in a fluid operated pressure-equalizing resistance welding device having a mounting base and a fluid powered cylinder and piston reciprocatively mounted on the base and separately carrying opposed pressure-applying current-carrying electrodes, the combination comprising a yoke member having one of its ends constructed for carrying one of the opposing electrodes of the device, member having means at said another end thereof for connecting the same to the one end of cylinder of the device, a movement-controlling plate having at one end means for joining itself to the base of the device, structure at its other end to act as a stop for the piston of the device, said structure including a slot to guide the piston rod for the piston of the device, and other structure intermediate its ends to act as a stop for the cylinder of the device, said other structure including another slot, means rollably carried in said other slot joined to the yoke member to control the movement of said one cylinder end.

12. In a fluid-operated pressure-equalizing resistance welding device having a base, a fluid powered piston and cylinder separately carrying opposed current-carrying pressure-applying electrodes and so constructed that on the power stroke of the piston its piston rod travels outwardly of one end of the cylinder, the free end of the piston rod joined to the electrode nearest said one end of the cylinder, a yoke member joining said one cylinder end and the other of said electrodes, track means on the base at the end of the cylinder opposite said one end, said opposite cylinder end joined to means rollably carried in said track means, the electrodes closing in one plane on the power stroke of the piston, a pivot connection for the cylinder at said track means pivotally connecting said opposite cylinder end and the base, said pivot connection moveable with the cylinder relative to the base, tripping mechanism causing the cylinder and piston to be tipped about said pivot connection during the stroke of the piston, the final opening movement of the electrodes on the return stroke of the piston being in another plane angularly disposed with respect to said one plane, said tripping mechanism including a member fixed on said base at said one cylinder end and having track means therein, a side of the yoke member and a side of the piston rod separately joined to means rollably carried in said last-mentioned track means for controlling, respectively, the movement of said one cylinder end and the free end of the piston rod during the tipping of the cylinder and piston.

13. In a fluid-operated pressure-applying device having a mounting base, a pressure-applying tip, a fluid-operated drive for said tip comprising two primary elements, said tip carried by one of said elements, one element a piston having its piston rod operating out of one end of said drive, a mounting arrangement for reciprocating said drive relative to the base comprising cam and track means joining the base and said drive.

14. The mechanism claimed in claim 13 and in which an arrangement is provided for pivotally as well as reciprocatively mounting said drive on the base, said pivotal arrangement comprising a pivot connection for the other element of said drive which is moveable therewith relative to the base.

15. In a fluid-operated pressure-equalizing pressure-applying device having a mounting base, a pair of opposed pressure-applying tips, a fluid operated drive for said tips comprising two primary elements separately carrying said tips, one element a piston having its piston rod operating out of one end of said drive, a mounting arrangement for reciprocating said drive relative to the base which equalizes the pressure applied between said tips comprising cam and track means joining the base and said drive.

16. The mechanism claimed in claim 15 and in which the piston rod operates out of the front end of the drive and is joined to the tip nearest said front end, a connecting arrangement between the tip furthest from said front end and the other element of said drive, the applied pressure transmitted in a circle of forces at the front end of the drive via the connecting arrangement, said mounting arrangement interconnected with said connecting arrangement via said cam and track means but transmitting no part of this circle of forces and being independent force-wise of said connecting arrangement.

17. The mechanism claimed in claim 16 and in which the other element of said drive comprises a cylinder.

18. The mechanism claimed in claim 17 and in which said cam and track means comprises track means on the base, means rollably carried in said track means, and means joining the cylinder and piston rod to said last-mentioned means.

19. In a fluid-operated pressure-equalizing resistance welding device having a mounting base, a pair of opposed pressure-applying current-carrying electrodes, a fluid-operated drive for said electrodes comprising a cylinder and piston, the piston rod for the piston operating out of the front end of the cylinder and joined to the electrode nearest said front end and transmitting thereto the fluid force applied to the piston, a connecting arrangement between the front end of the cylinder and the electrode furthest from said front end and transmitting thereto the fluid force applied to the cylinder, a mounting arrangement for reciprocating said drive relative to the base which equalizes the welding pressure applied between said electrodes comprising cam and track means joining the base and said drive, the welding pressure transmitted in a circle of forces at the front end of the drive via the connecting arrangement, said mounting arrangement interconnected with said connecting arrangement via said cam and track means but transmitting no part of this circle of forces and being independent force-wise of said connecting arrangement.

20. The mechanism claimed in claim 19 and in which the connecting arrangement includes a yoke having one end joined to the front end of the cylinder and another end carrying the furthest electrode, said yoke interconnected with said cam and track means.

21. The mechanism claimed in claim 20 and in which said cam and track means comprises track means on the base, means rollably carried in said track means, and means joining the cylinder, piston rod and yoke to said last-mentioned means.

22. The mechanism claimed in claim 21 and in which an arrangement is provided for pivotally as well as reciprocatively mounting said drive on the base, said pivotal arrangement comprising a pivot connection for the cylinder which is moveable therewith relative to the base.

23. The mechanism claimed in claim 22 and in which said pivot connection is at the rear end of the cylinder.

24. The mechanism claimed in claim 23 and in which said pivot connection comprises an axle carried on said rear cylinder end, a cam roller rotatably mounted on said axle, and a track in the base in which said rotatably mounted cam roller operates.

25. The mechanism claimed in claim 24 and in which a restrictor to reciprocation of the drive is provided which operates to positively effect pivotal movement thereof under fluid pressure in each stroke of the piston.

26. The mechanism claimed in claim 25 and in which said restrictor to reciprocation of the drive comprises a cam roller carried on the free end of the piston rod, a second track in the base in which said piston rod cam roller operates, a cam roller carried on the yoke, and a third track in the base in which said yoke cam roller operates.

27. The mechanism claimed in claim 26 and in which said third track has a leg substantially perpendicular to the axis of reciprocation of the drive which co-acts with said yoke cam roller so that in the closing movement of the electrodes during the weld stroke, said furthest electrode which is carried by the yoke has substantially no longitudinal movement relative to the base while the drive is pivoting.

28. The mechanism claimed in claim 20 and in which one elastic control is provided which governs the inertia of one of said cylinder and piston during the weld stroke of the piston, characterized in a yieldable means operating on the cylinder through the yoke and against the base, one end of said yieldable means moveable with said yoke.

29. The mechanism claimed in claim 28 and in which a pair of elastic controls is provided which govern the inertia of both said cylinder and piston during the weld stroke of the piston, characterized in a pair of yieldable means operating oppositely on the cylinder through the yoke and against the base both coordinately in the weld stroke of the piston, one end of each yieldable means movable with the yoke.

30. The mechanism claimed in claim 29 and in which said pair of yieldable means comprises a pair of compression springs arranged side by side on the base, one pair of opposite ends of said springs moveable with the yoke.

31. For use in a fluid-operated pressure-equalizing resistance welding device having a mounting base and a fluid powered cylinder and piston drive reciprocatively mounted on the base, a yoke member having one of its ends constructed for carrying one of the opposing electrodes of the device, said member having means at another end thereof for connecting the same to one end of the cylinder of the device, said member also having a cam roller joined to it between said ends by which it controls the movement of said one cylinder end.

32. The combination of the yoke member claimed in claim 31 and a movement controlling plate having means for securing itself to the base of the device, said movement controlling plate having structure at one of its ends to act as a stop for the piston of the device, and other structure to act as a stop for the cylinder of the device, said other structure including track means in which said yoke member cam roller operates in controlling the movement of said one cylinder end.

33. For use in a fluid-operated pressure-equalizing resistance welding device having a fluid powered cylinder and piston drive, apparatus for controlling the inertia of the cylinder and piston during the weld stroke comprising a pair of compression springs, a casing commonly carrying said springs for operation in side by side disposition, structure projecting out of one end of the casing for individually adjusting the compression on each spring, said structure operating on one pair of opposite ends of said springs, the other pair of opposite spring ends operating oppositely on the casing, the casing moveable in opposite directions axially of said structure.

34. For use in a fluid operated pressure-equalizing welding device having a fluid powered cylinder and piston drive, a mounting base for reciprocatively mounting said drive, said base having track means parallel to the axis of reciprocation of said drive, said base having two other track means with components parallel and angular to said reciprocation axis.

35. In a fluid-operated pressure-equalizing resistance welding device having opposed pressure-applying current-carrying electrodes, a fluid powered cylinder and piston drive for said electrodes, a mounting base for reciprocatively mounting said drive, cam and track means parallel to the axis of reciprocation of said drive joining the base and one end of the cylinder of said drive, two other cam and track means with components parallel and angular to said reciprocation axis joining, respectively, the other end of the cylinder and the piston rod for the piston to the base.

36. In a fluid-operated pressure-applying device having a mounting base, a fluid powered drive pivotally mounted relative to the base comprising two primary elements, one element a piston having its piston rod operating out of one end of said drive, a pressure-applying tip actuated by one of said elements, two cam rollers in fixed relationship to each other and track means in which said cam rollers operate interconnecting said last-mentioned element and said tip, said tip upon actuation having a swing path predetermined by the contour of said track means.

37. A pressure-equalizing device according to claim 36 having a pair of opposed pressure-applying tips and in which the drive is reciprocatively as well as pivotally mounted relative to the base to equalize the pressure applied between said tips, each tip actuated by one of the elements of the drive, one element of the drive and one tip interconnected by two cam rollers in fixed relationship to each other and track means in which said cam rollers operate, a third cam roller and respective track means in which said third cam roller operates interconnecting the other element of the drive and the other tip, said tips upon actuation having swing paths predetermined by the contour of said track means.

38. In a fluid-operated resistance welding device having a mounting base, a fluid powered drive pivotally mounted on the base comprising two primary elements, one element a piston having its piston rod operating out of one end of the drive, a pressure-applying current-carrying electrode actuated by one of said elements, two cam rollers in fixed relationship to each other and track means in which said cam rollers operate interconnecting said last-mentioned element and said electrode, said track means provided in stationary parts of the base and said cam rollers moveably operating therein, said electrode upon actuation having a swing path predetermined by the contour of said track means.

39. A pressure-equalizing resistance welding device according to claim 38 having a pair of opposed pressure-applying current-carrying electrodes and in which the drive is reciprocatively as well as pivotally mounted relative to the base to equalize the welding pressure applied between said electrodes, each electrode actuated by one of the elements of the drive, one element of the drive and one electrode interconnected by two cam rollers in fixed relationship to each other and track means in which said cam rollers operate, a third cam roller and respective track means in which said third cam roller operates interconnecting the other element of the drive and the other electrode, said track means provided in stationary parts of the base and said cam rollers moveably operating therein, said electrodes upon actuation having swing paths predetermined by the contour of said track means.

40. In a resistance welding device having a mounting base, a fluid powered drive, and a welding electrode, an arrangement for interconnecting the base, the drive and the electrode to control the swing path of the latter comprising a pivot connection for pivotally mounting the drive relative to the base, a pair of cam rollers in fixed relationship to each other and track means in which said cam rollers operate interconnecting one of the elements of the drive and said electrode.

41. In a resistance welding device having a mounting base, a fluid powered drive, and a pair of opposed welding electrodes, an arrangement for interconnecting the base, the drive and the electrodes to control the swing paths of the latter comprising a pivot and reciprocative connection for pivotally and reciprocatively mounting the drive relative to the base, a pair of cam rollers in fixed relationship to each other and track means in which said cam rollers operate interconnecting one of the elements of the drive and one of said electrodes, and a third cam roller and respective track means in which said third cam roller operates interconnecting the other element and the other electrode.

References Cited in the file of this patent

UNITED STATES PATENTS

| | | |
|---|---|---|
| 2,839,665 | Wolfbauer | June 17, 1958 |
| 2,879,373 | Fagge | Mar. 24, 1959 |
| 2,952,765 | Droste | Sept. 13, 1960 |